United States Patent Office 2,813,597
Patented Nov. 19, 1957

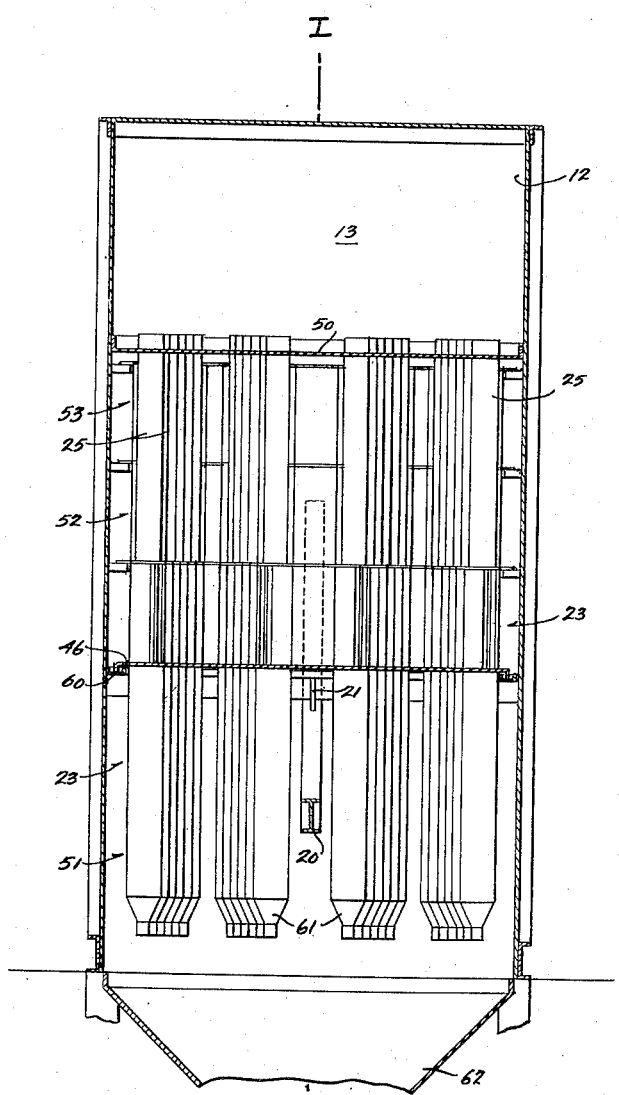
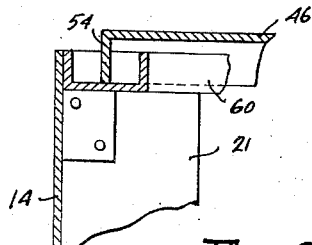
Fig. 2.
Fig. 6.
INVENTOR.
MELVIN W. FIRST
BY
Bean, Brooks, Buckley & Bean
ATTORNEYS Nov. 19, 1957
M. W. FIRST
2,813,597
MULTI-DUST COLLECTORS
Filed July 25, 1955
3 Sheets-Sheet 3
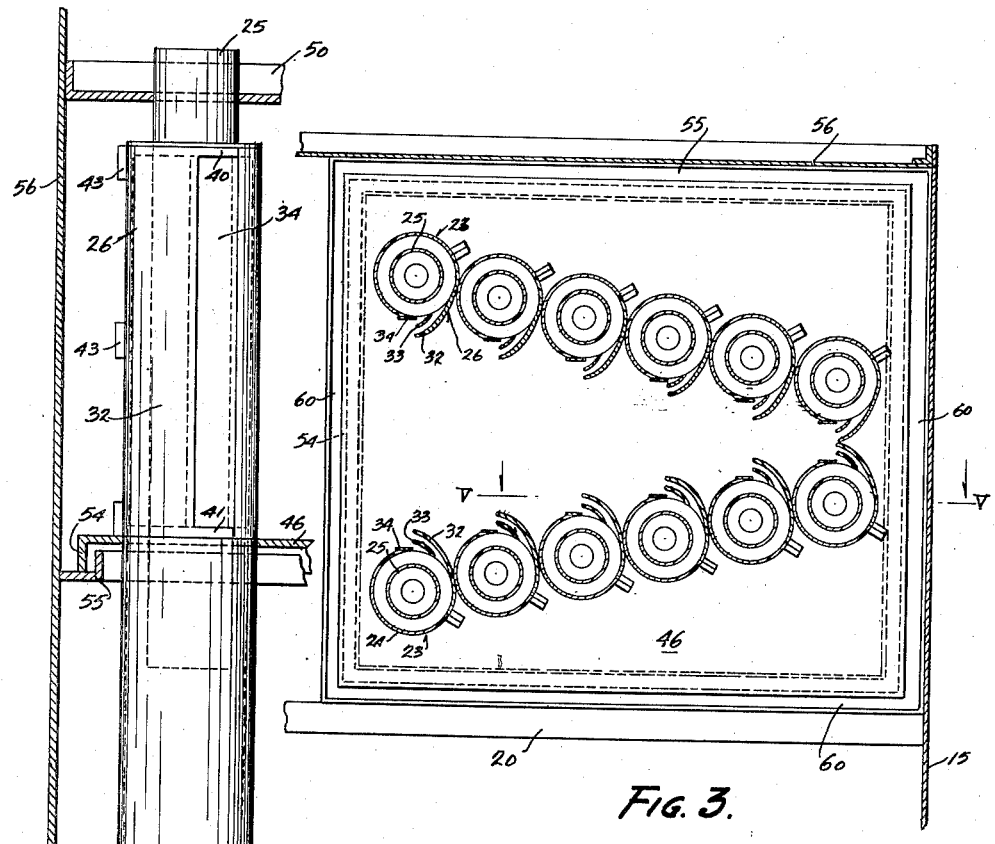
FIG. 3.
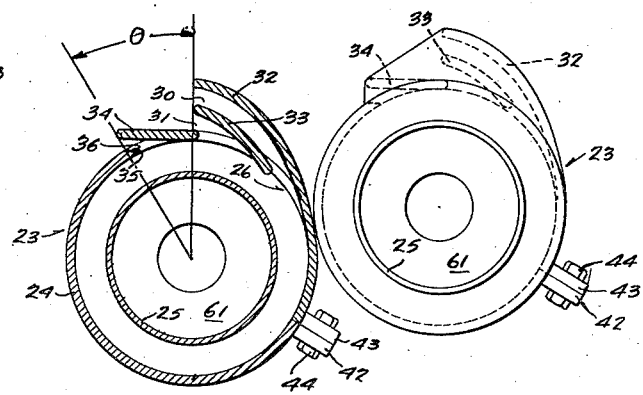
FIG. 4.
FIG. 5.
INVENTOR.
MELVIN W. FIRST
BY
Beau, Brooks, Buckley & Beau.
ATTORNEYS

2,813,597

MULTI-DUST COLLECTORS

Melvin W. First, Newton Centre, Mass., assignor to Buffalo Forge Company, Buffalo, N. Y.

Application July 25, 1955, Serial No. 524,015

7 Claims. (Cl. 183—81)

My invention relates in general to an apparatus for separating particles of dust, ash, pulverized fuel or other media entrained in the air.

The principal object of my invention is to provide a plurality of individual separators arranged as a unit assembly which may be readily removed from the apparatus for cleaning or replacement.

Another object is to provide each individual separator with intake openings arranged at one side only and extending around the dust tube of the separator for a distance of less than 180° of its periphery.

Another object is to provide an assembly unit having a plurality of separators closely arranged in rows and so disposed that each pair of oppositely arranged separators receives optimum flow distribution of air therethrough.

Another object is to provide a number of individual separators arranged in pairs, each row being arranged at an angle with the adjacent row, the inclination of such rows being such that the incoming air will have free access to the inlet openings of the separators.

Another object is to provide a series of assembly units having their inlet openings arranged at different levels, whereby each unit will receive a portion of the incoming dust laden air.

Another object is to provide each assembly unit with a top tube plate and a bottom tube plate, each bottom tube plate being formed with means for sealing the unit against leakage between it and its support.

Another object is to provide a separator having a dust tube provided with a separate removable flight section formed with the tube inlet openings.

Moreover, such flight section may be readily removed from the tube for cleaning or replacement when necessary.

The above objects and advantages have been accomplished by the device shown in the accompanying drawings, of which:

Fig. 2 is a front sectional elevation taken on line II—II of Fig. 1;

Fig. 3 is an enlarged top sectional plan view of one of the assembly units taken on line III—III of Fig. 1;

Fig. 4 is a greatly enlarged fragmentary sectional plan view of two of the separators taken on line IV—IV of Fig. 1;

Fig. 5 is a greatly enlarged fragmentary view of the upper end of one of the separators, portions of the supporting structure being shown in section taken on line V—V of Fig. 3; and Fig. 6 is an enlarged fragmentary sectional view of the supporting means and seal for the assembly units.

Figure 1:
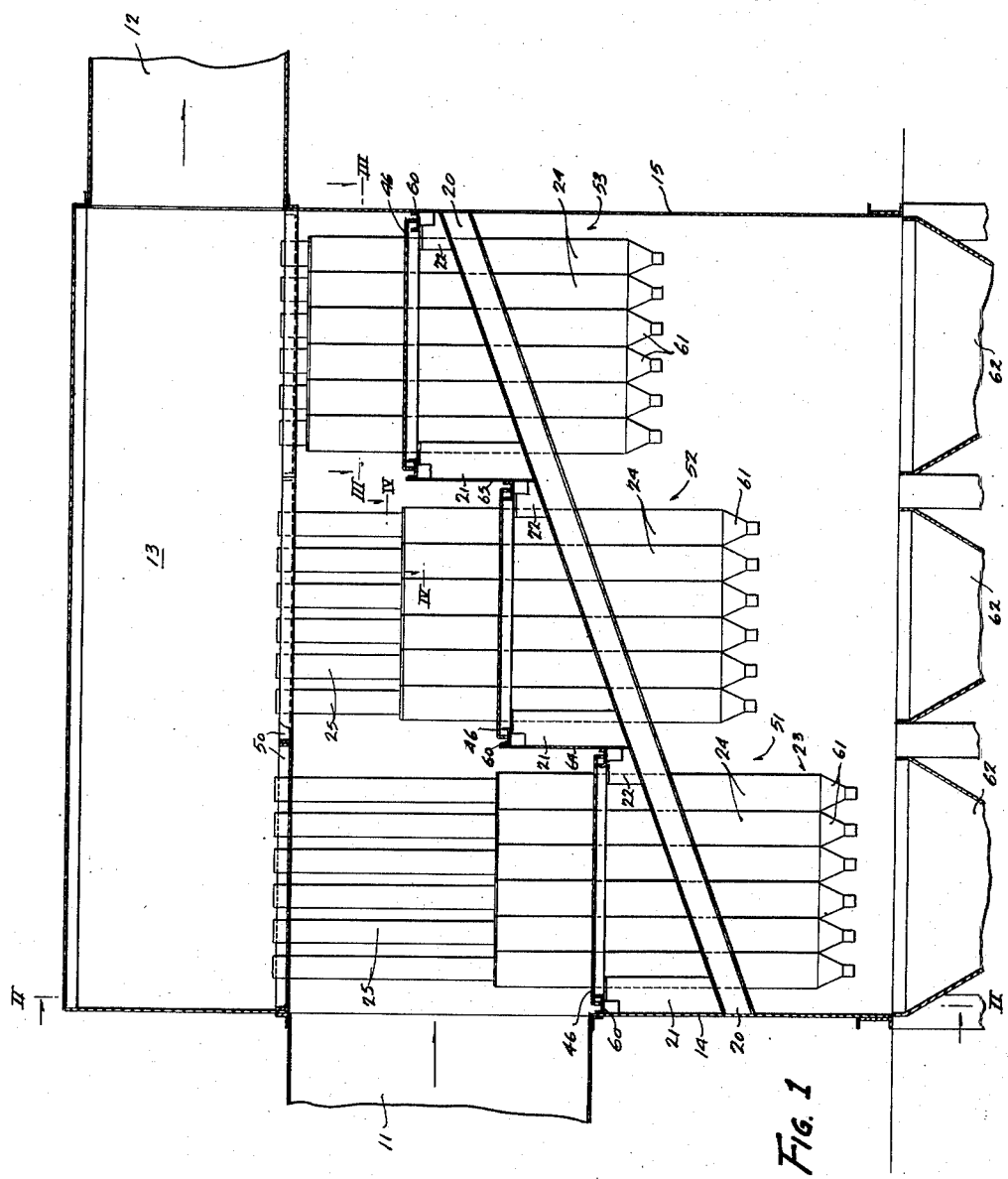
Fig. 1 is a side sectional elevation of my complete device taken on line I—I of Fig. 2.

My device comprises a casing 10 having an inlet duct 11 and an outlet duct 12 extending from the plenum chamber 13. The casing is provided with a front wall 14 and with a rear wall 15. The inlet and outlet ducts extend preferably across the full width of the front and back walls, respectively.

As shown in the drawings, there are three assembly units, mounted in the casing 10. These assembly units are preferably arranged in pairs on each side of the longitudinal center of the casing, and a brace 20 is extended through the center of the casing between the pairs of units. The brace is preferably inclined forwardly and downwardly toward the inlet opening and it is secured at the forward end to the front wall 14 of the casing and at the rear end to the back wall 15 thereof. Front and rear saddles 21 and 22, respectively, are provided for each unit and they are carried by the brace 20 for supporting each pair of opposite assembly units. The front saddles 21 are longer than the rear saddles 22 and they are disposed in front of the rear saddles, whereby the top surfaces of each pair lie in substantially the same horizontal plane. The front and rear saddles for each unit are substantially of the same length so that when in position upon the inclined brace 20 each successive pair from the inlet end will be at a higher horizontal level than the preceding pair.

Each of the individual separators 23 comprises a dust tube 24 in the upper end of which is disposed an outlet tube 25. One side of each dust tube is cut away a distance around the periphery thereof substantially less than 180°, said cut away portion extending for substantially one-third the length of said tube, and a removable flight section 26 is fitted into the opening thus formed. This section is provided with spaced guide vanes 32, 33 and 34, thereby forming inlet slots 30 and 31. The guide vanes of each separator are so arranged that the vane 34 is substantially parallel with the direction of flow of the incoming dust laden air and the vanes 32 and 33 which are tangentially arranged have their advance ends extending outwardly toward the air current and having their forward edges in substantial alignment with one another and only a small distance in advance of the inner end of the vane 34. The spaces between the vanes are relatively narrow and substantially uniform in width, whereby the air will be caught by the vanes and directed in thin layers into the dust tubes in tangential manner. The edge 35 of the dust tube opening is spaced from the vane 34, whereby an inlet slot 36 is provided. As shown in Fig. 4, the inlet openings are spaced around only a portion of the periphery of the flight section and are arranged only at one side thereof covering a peripheral distance of less than 180°. As shown in Fig. 4 of the drawings, however, it is preferable that the entrance ends of the slots 30, 31 and 36 are included within an angle, designated θ of substantially 30°. The flight section is preferably of cast material with the inlet vanes integrally formed therewith, and it is provided with an integral upper cover plate 40 and with a lower cover plate 41. The cover plates extend across the top and bottom of the guide vanes and serve to support the same as well as to close off the upper and lower ends of the inlet slots 30, 31 and 36. The outlet of each separator tube 25 is extended down below the lower end of the flight section 26 so that the air is obliged to travel downwardly a distance before it is allowed to pass up and out through the tube, thereby assuring substantially complete separate entrained dust. In order to secure the flight section in place, a number of attachment flanges 42 are arranged along the edge of the opening formed in the dust tube, and companion flanges 43 are formed on the flight section. Suitable bolts 44 are passed through each pair of adjacent flanges thus clamping the flight section in place.

As shown in Fig. 3, each assembly unit is formed with a plurality of individual separators 23, arranged in two spaced-apart rows, the rows being so arranged with respect to each other and to the general direction of inlet air flow that a plane passing through the axes of one row will be at an angle to the plane passing through the axes of the other row. The individual separators of each angularly disposed row are closely arranged with the inlet slots of one row facing those of the opposite row, whereby dust laden air is forced to pass between and along the sides of the rows. It will be seen by reference to Fig. 3 that the guide vanes of each of the individual separators will project beyond the vanes of the preceeding unit, whereby each unit receives its portion of dust laden air and optimum performance results.

Each assembly unit comprises a series of separators carried by a lower tube plate 46 and an upper tube plate 50. The lower tube plate is arranged preferably near the lower end of the flight section 26 and each of the dust tubes 23 is suitably secured thereto. The outlet tubes of each unit pass through the upper tube plate 50 and are suitably secured thereto, thereby forming a complete unit assembly which can be readily placed within or removed from the casing. As shown in Fig. 1, three assembly units 51, 52 and 53 are provided on each side of the casing, the inlet portions of the dust tube thereof being arranged in different levels whereby the air coming in through the inlet duct 11 will be distributed over the six assembly units. As shown in these figures, the outlet tubes 50 of the assembly units 51 are longer than those of the assembly units 52, and those of the assembly units 52 are longer than those of the assembly unit 53. As clearly shown in Fig. 1, all of the outlet tubes extend up inside of the plenum chamber 13 to conduct the dust free air from the assembly units. Extending across the casing are partitions 64 and 65 which extend from the rear lateral channel iron 60 of the lower assembly unit 51 to the front channel iron of the middle unit 52 and from the front channel iron of the middle unit 52 to the front channel iron of the top or upper unit 53, thereby sealing the space below the inlet opening of the successive unit.

Each of the lower tube plates of the assembly units is formed with a downwardly turned peripheral flange 54 which engages with an angle iron 55 secured to the side wall 56 of the casing and with connected channel irons 60 extending laterally across the casing and longitudinally through the center thereof. The parts are so proportioned that the flanges 54 of the plates will be positioned substantially in the center of the space between the upturned sides of the channel irons and between the upwardly extending leg of the angle iron and the side walls of the casing. The proportion of the bearing surfaces between the engaging parts are such as to be substantially sufficient to provide a seal between the parts, but if desired, the channel iron and space confined by the angle irons may be filled with any suitable mastic material.

Each of the dust tubes is formed at its lower end with a tail piece 61 from which dust collected in each of the dust tubes is discharged into a suitable hopper 62.

From the foregoing it will be obvious that dust laden air entering the casing 10 will be passed to and through the inlet openings of each of the assembly units at substantially the same velocity, the air free of the entrained dust passing up through the air tubes and entering the plenum chamber, whence it is discharged through the outlet opening 12. The dust laden air presented to the individual separator units will be passed through the inlet slots 30, 31 and 36, and the dust which is entrained in the air will be separated from the air and passed down through the dust tube and into the hoppers below.

While I have shown and described six assembly units, it is obvious that the invention is not limited to any number of units but that any one of the units may be used singly in a casing with all the advantages of the invention. Obviously, therefore, some modifications of the details herein shown and described may be made; and I do not wish to be limited to the exact embodiment herein shown and described.

What is claimed is:

1. In a dust collector comprising a casing, a separator assembly unit removably mounted within said casing, said unit comprising a plurality of individual separators arranged in two converging rows, each separator comprising a dust tube and an air tube having its lower end extending into said dust tube, the upper end of the dust tube being formed with a cut-out portion occupying less than 180° of the dust tube circumference and extending for a distance equal to substantially one-third of its length, the lower end of said air tube extending below the lower end of said cut-away portion, a removable flight section disposed in the cut-out portion of the tube and formed with a plurality of adjacent inlet slots of substantially uniform width and extending substantially the full length of said flight section, the slots extending around the periphery of said flight section a distance less than that included within an angle of 180°, and means for removably fastening said section in place within said dust tube.

2. A dust collector comprising a casing, a separator assembly unit removably mounted within said casing, said unit comprising a plurality of individual separators arranged in two converging rows, each separator comprising a dust tube and an air tube having its lower end extending into said dust tube, the upper end of the dust tube being formed with a cut-out portion occupying less than 180° of the dust tube circumference extending for a distance equal to substantially one-third of its length, the lower end of said air tube extending below the lower end of said cut away portion, a removable flight section disposed in the cut-out portion of the tube, said flight section being formed with a plurality of vertical inlet slots extending substantially the full length thereof and provided by a substantially flat guide vane having its inner surface in tangential arrangement with the inner diameter of said tube and having its outer edge spaced from the adjacent edge of the cut-out portion, two curve-shaped guide vanes spaced from each other and from the flat vane, thereby providing parallel air slots, the air slots extending around the periphery of said flight section a distance less than that included within an angle of 180°, and means for removably fastening said section in place within the dust tube.

3. A dust collector comprising a casing having an undivided air inlet, a series of independent separator assembly units detachably mounted within said casing and arranged in succession, each unit comprising a plurality of individual separators arranged in converging rows, each separator comprising a dust tube and an air tube, each of said dust tubes being formed with intake openings, said units being in stepped arrangement and so disposed that the lower ends of the intake openings of the first unit are located substantially opposite the lower end of said air inlet, and the lower ends of the intake openings of the tubes of each next succeeding unit are located in a horizontal plane substantially coincident with a plane passing through the upper ends of the intake openings of the next preceeding unit, whereby the intake openings of the dust tubes are directly exposed to the air inlet, supporting means for each unit, a laterally arranged vertical partition between each successive unit, and means carried at the periphery of each unit for bearing contact with said supporting means, whereby said assembly units are detachably supported within the casing independent of each other.

4. A dust collector comprising a casing having an undivided air inlet, a series of independent separator assembly units mounted within said casing and arranged in succession, each unit comprising a plurality of individual separators arranged in converging rows, each separator comprising a dust tube and an air tube, each of said dust tubes being formed with intake openings, said units being in stepped arrangement and so disposed that the lower ends of the intake openings of the first unit are located substantially opposite the lower end of said air inlet, and the lower ends of the intake openings of the tubes of each next succeeding unit are located in a horizontal plane substantially coincident with a plane passing through the upper ends of the intake openings of the next preceeding unit, whereby the intake openings of the dust tubes are directly exposed to the air inlet, an upper tube plate and a lower tube plate for carrying the separators of each of said units independently of the separators of the other units, means for supporting each unit, a vertical partition between each successive unit, and means carried at the periphery of each lower tube plate for bearing contact with said support, whereby said assembly units are detachably supported within the casing independent of each other.

5. A dust collector comprising a casing having an undivided air inlet, a series of independent separator assembly units mounted within said casing and arranged in succession, each unit comprising a plurality of individual separators arranged in converging rows, each separator comprising a dust tube and an air tube, each of said dust tubes being formed with intake openings, said units being in stepped arrangement and so disposed that the lower ends of the intake openings of the first unit are located substantially opposite the lower end of said air inlet, and the lower ends of the intake openings of the tubes of each next succeeding unit are located in a horizontal plane substantially coincident with a plane passing through the upper ends of the intake openings of the next preceeding unit, whereby the intake openings of the dust tubes are directly exposed to the air inlet, an upper tube plate and a lower tube plate for carrying the separators of each of said units independently of the separators of the other units, an oblique brace extending centrally through the casing and disposed longitudinally thereof, and saddle members carried by said brace at different levels and arranged between adjacent units for supporting the lower plate of said units.

6. A dust collector comprising a casing, a separator assembly unit removably mounted within said casing, said unit comprising a plurality of individual separators arranged in two converging rows, each separator comprising a dust tube and an air tube having its lower end extending into said dust tube, the upper end of the dust tube being formed with a cut-out portion occupying less than 180° of the dust tube circumference and extending for a distance equal to substantially one-third of its length, the lower end of said air tube extending below the lower end of said cut away portion, a removable flight section disposed in the cut-out portion of the tube and formed with a plurality of adjacent inlet slots of substantially uniform width and extending substantially the full length of said flight section, the entrance ends of the slots being so arranged that they are included within an angle of substantially 30°, and means for removably fastening said section in place within said dust tube.

7. A dust collector comprising a casing, a separator assembly unit removably mounted within said casing, said unit comprising a plurality of individual separators arranged in two converging rows, each separator comprising a dust tube and an air tube having its lower end extending into said dust tube, the upper end of the dust tube being formed with a cut-out portion occupying less than 180° of the dust tube circumference extending for a distance equal to substantially one-third of its length, the lower end of said air tube extending below the lower end of said cut away portion, a removable flight section disposed in the cut-out portion of the tube, said flight section being formed with a plurality of substantially parallel vertical inlet slots extending substantially the full length thereof and formed by a substantially flat guide vane and by two interspaced curve-shaped guide vanes, said flat vane having its inner surface in tangential arrangement with the inner diameter of said air tube and having the outer edge spaced from the adjacent edge of the cut-out portion, the entrance ends of said air slot being arranged so that they are included within an angle of substantially 30°, and means for removably fastening said section in place within the dust tube.

References Cited in the file of this patent

UNITED STATES PATENTS

| | | |
|---|---|---|
| 2,327,691 | Allardice | Aug. 24, 1943 |
| 2,346,672 | Fletcher | Apr. 18, 1944 |
| 2,433,774 | Madeley | Dec. 30, 1947 |
| 2,439,850 | Heller | Apr. 20, 1948 |
| 2,461,677 | Burdock et al. | Feb. 15, 1949 |
| 2,553,175 | Davenport et al. | May 15, 1951 |
| 2,696,895 | Phyl | Dec. 14, 1954 |

FOREIGN PATENTS

| | | |
|---|---|---|
| 466,983 | Great Britain | June 9, 1937 |
| 1,084,516 | France | July 7, 1954 |